(12) United States Patent
Kidalka

(10) Patent No.: US 7,924,295 B2
(45) Date of Patent: Apr. 12, 2011

(54) IMAGE PROCESSING DEVICE FOR EXPANDED REPRESENTATION OF THREE-DIMENSIONAL IMAGE DATA SETS

(75) Inventor: Bernhard Kidalka, Buttenheim OT Gunzendorf (DE)

(73) Assignee: Siemens Aktiengesellschaft, Munich (DE)

( * ) Notice: Subject to any disclaimer, the term of this patent is extended or adjusted under 35 U.S.C. 154(b) by 525 days.

(21) Appl. No.: 11/693,069

(22) Filed: Mar. 29, 2007

(65) Prior Publication Data

US 2007/0229547 A1    Oct. 4, 2007

(30) Foreign Application Priority Data

Mar. 30, 2006    (DE) .......................... 10 2006 014 902

(51) Int. Cl.
*G09G 5/00* (2006.01)

(52) U.S. Cl. ......... 345/624; 345/427; 345/418; 345/633

(58) Field of Classification Search .................. 345/418, 345/624, 427, 633

See application file for complete search history.

(56) References Cited

U.S. PATENT DOCUMENTS 5,293,529 A * 3/1994 Yoshimura et al. ........... 345/158
6,429,884 B1 * 8/2002 Budz et al. .................... 715/848

OTHER PUBLICATIONS

Murdock, Kelly L. 3ds max 7 Bible. New York: Wiley, 2005.*
"3ds max 7 Bible" product information web page from online book retailer Amazon.com, accessed Jul. 29, 2009.*
Persistence of Vision™ Ray-Tracer, User's Documentation, POV Team (1999) pp. 1-17, 23-29, 54-69, 82, 97-101, 136-138, 177-182, 250-256, 294-300, 317-320.
"Graphics: Reflection Model," Graphics Lab, Korea University (2004),PowerPoint Presentation—41 sheets.

* cited by examiner

*Primary Examiner* — Xiao M Wu
*Assistant Examiner* — Scott E Sonners
(74) *Attorney, Agent, or Firm* — Schiff Hardin LLP

(57) ABSTRACT

An image processing device has an image presentation module that is fashioned for 3D representation of a 3D subject on an image display device, and has an interaction module with which an operator can interactively displace, rotate or zoom the 3D subject in the 3D representation. The image processing device furthermore has a mirror surface generation module that generates mirror surfaces that are freely definable by the operator via the interaction module in the 3D space of the 3D representation, and shows mirror images caused by the defined mirror surfaces on separate display areas of the image display device. The analysis of a presented 3D subject thus can ensue with lower time expenditure.

5 Claims, 1 Drawing Sheet

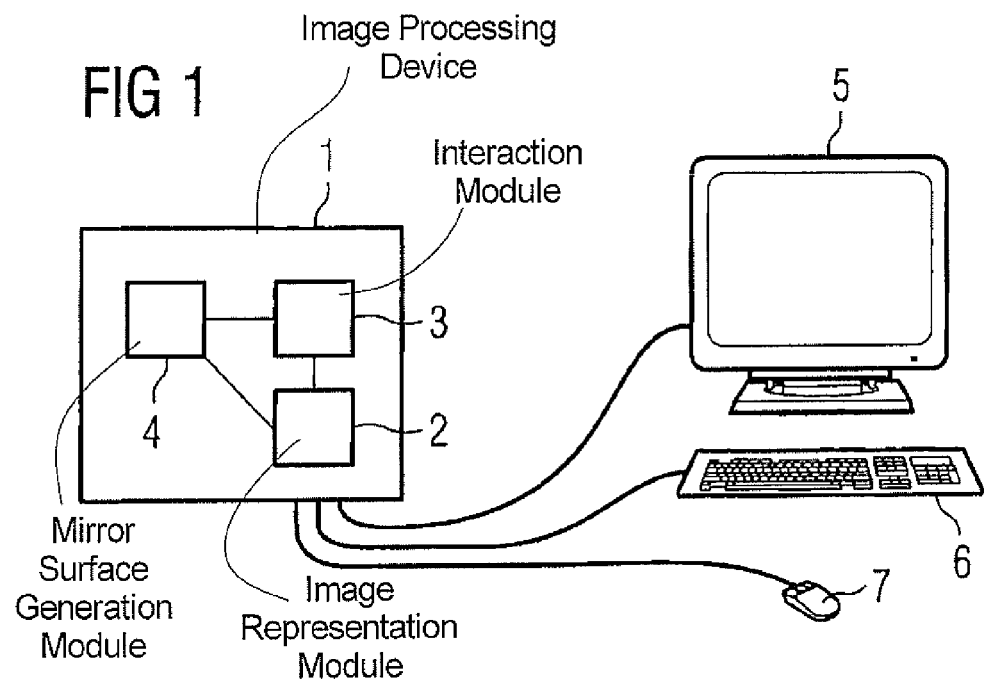
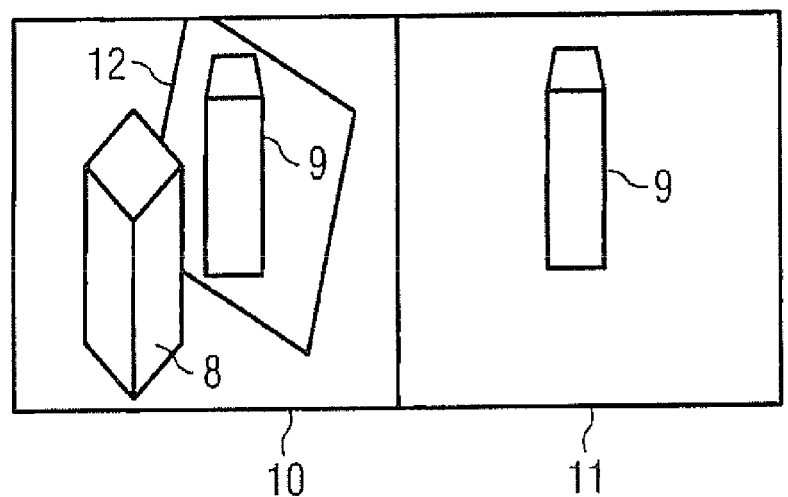

IMAGE PROCESSING DEVICE FOR EXPANDED REPRESENTATION OF THREE-DIMENSIONAL IMAGE DATA SETS

BACKGROUND OF THE INVENTION

1. Field of the Invention

The present invention concerns an image processing device for an expanded representation of a three-dimensional image data set, in particular of a three-dimensional image data set from medical imaging, with an image presentation module that is fashioned for 3D representation of a 3D subject on an image display device and an interaction module via which an operator can interactively displace, rotate or zoom the 3D subject in the 3D representation.

2. Description of the Prior Art

Computer graphic systems are known with which (3D) objects and scenes can be shown on a presentation module. The representation of the objects can be manipulated in versatile manners, for example by rotation, translation or zooming. To improve the realistic impression of an object or of a scene, various exposure situations as well as reflections of the object on the surface of other objects are shown. Algorithms known as ray tracing algorithms (ray tracing) and radiosity methods based thereon are used (see "Graphics: Reflection Model, Graphics Lab, Korea Univ., 2004, 41 sheets+bibliography (http://kucg.korea.ac.kr/~sjkim/teach/2004/COMP365/lecture/07reflection.ppt)" or A. Iwansky et al., "Lexikon der Computergraphik und Bildverarbeitung", Vieweg 1994, p. 18, 56-58, 231-234, 237, 249-250, 274, 306). A computer program suitable for realistic representation of 3D objects is Persistence of Vision™ Ray Tracer, POV-Ray™ version 3.1g, "User's Documentation", POV-Team, 1999, p. 1-17, 23-29, 54-69, 82, 97-101, 136-138, 177-182, 250-256, 294-300, 317-320.

The 3D representation of 3D objects represents an important tool in many technical fields, for example in the field of medical imaging and in the design of technical apparatuses. For example, radiologists and surgeons use 3D visualization devices for assessment and planning of operations, the 3D visualization devices showing anatomical regions of interest of a patient three-dimensionally in perspective representation on a monitor using volume rendering techniques (VRT) on the basis of a medical 3D image data set obtained from the patient. By suitable tissue specifications it is thereby possible to display to the physician only the structures of interest (for example only the vessels) of the examined region or of the region encompassed by the 3D image data set. With the available means the physician must then determine from this 3D representation the information that is relevant to him or her. For example, this may be vessel stenoses, and their position and orientation relative to other vessels etc.

For this purpose the visualization device normally has an interaction module with which the operator can rotate, displace or zoom the shown volume interactively in all spatial directions. During the assessment and planning these steps are often repeated multiple times, since it is very often necessary to consider the subject of interest from all sides. These repeated interactions can be very time-consuming depending on the problem.

SUMMARY OF THE INVENTION

An object of the present invention is to provide an image processing device for a 3D representation of a 3D subject that provides a time savings to the user in the analysis of the shown three-dimensional subject.

The object is achieved by an image processing device according to the invention that has, in a known manner, an image presentation module that is fashioned for 3D representation on an image display device of a 3D subject from a 3D image data set; and an interaction module via which a user can interactively displace, rotate or zoom the 3D subject in the 3D representation. The image processing device according to the invention is characterized by a mirror-surface generation module that generates mirror surfaces freely definable by the operator via the interaction module in the 3D space of the 3D representation, and that shows mirror images caused by the mirror surfaces on separate display areas of the image display device.

during the use of the inventive image processing device, the user can thus simulate the position and orientation of one or more mirror surfaces in the 3D space of the 3D representation, and through these mirror images, rear (reversed) and lateral details of the shown 3D subject can additionally be visualized in other display segments of the image display device. The numerous, previously required repeated interactions thus no longer have to be implemented in the analysis of the 3D subject in the 3D representation, such that the user saves time. The rear details in the directly presented view are simultaneously visualized by a suitable specification of a mirror surface, to the user no longer has to interactively rotate the 3D subject in order to view these details.

As used herein, "3D representation" encompasses both a true three-dimensional representation on a 3D image data apparatus suitable for this purpose, and an image representation on a conventional image display apparatus, for example a conventional monitor on which a three-dimensional impression of the subject is generated according to the manner of the image representation. This can be achieved by a perspective representation and/or by suitable volume or surface rendering techniques. In each case the user is given the possibility to interactively displace, rotate and zoom the shown 3D subject in order to be able to consider it from all sides. The use of a 3D monitor can lead to a representation improvement since a better spatial relation is imparted due to the additional depth information.

The interaction ensues in a known manner via a graphical user interface with a suitable input apparatus, for example a mouse. The user also establishes the position and orientation of the desired mirror surfaces in the 3D space of the 3D representation via this user interface and the associated input apparatus.

In an embodiment of the inventive image processing device, the image presentation module is fashioned such that it divides the display device into a number of segments, with the 3D representation of the 3D image data set ensuing in one of these segments. Other image views then can be shown in the other segments, as is frequently the case in imaging medical technology. In the present embodiment the mirror images generated by the mirror surfaces are then shown in one or more of the other segments. Each segment or each display area is thereby linked with another mirror surface. Given an interactive change of the 3D representation, the mirror images are advantageously synchronously updated. Many details of the 3D subject of interest can therewith be shown simultaneously in a simple manner.

The mirror images naturally also can be visualized in the 3D representation, but given a high number of mirror surfaces this can lead to an unclear representation.

The inventive image processing device can be used in the field of medical imaging, for example for visualization of 3D image data sets of computed tomography, magnetic resonance tomography or other tomographic imaging methods. Additionally, the image processing device can be used generally in all non-medical problems in which 3D objects are visualized three-dimensionally in the form of a perspective or even (in the case of CAD-CAM applications) orthogonal representation.

DESCRIPTION OF THE DRAWINGS

FIG. 1 is a schematic illustration of an embodiment of an image processing device in accordance with the present invention.

FIG. 2 schematically illustrates an example of an image representation that can be generated with an image processing device in accordance with the invention

DESCRIPTION OF THE PREFERRED EMBODIMENTS

FIG. 1 is a schematic representation of an embodiment of an image processing device 1 that has an image representation module 2, an interaction module 3 as well as a mirror surface generation module 4. The image processing device is advantageously implemented in a computer in which the 3D image data set of the subject to be represented is stored in a storage unit. The image processing device is in communication with a monitor 5 as well as a keyboard 6 and a computer mouse 7, with which the user can displace, rotate and zoom the image shown on the monitor 5 as well as input the position and orientation of mirror surfaces.

After the importation of the 3D image data set, it is initially processed in the image presentation module 2 in order to show on the monitor 5 a perspective VRT representation of the subject embodied in this 3D image data set. This representation normally ensues with a predefined (default) perspective and size, or with a perspective and size that can be provided by the user. In this 3D representation, the user can now freely define mirror surfaces in 3D space in order to additionally obtain rear and lateral views of the shown subject without having to rotate the subject itself on the screen. Through these mirror surfaces (which are generated according to a specification by the user in the mirror surface generation module 4 and that are mixed into the representation, for example into the original 3D representation, rear and lateral details of the subject of interest can be additionally viewed.

The presentation of one or more mirror images that are caused by these mirror surfaces advantageously ensues at other presentation segments of the monitor, as is illustrated in FIG. 2. In FIG. 2 only one three-dimensional subject 8, having a simple geometry is shown for simplicity. Furthermore, the display area of the monitor here is divided into only two display segments 10, 11. In the left segment 10 the presentation of the three-dimensional subject 8 obtained from the 3D image data set ensues in a corresponding perspective presentation as this is indicated in FIG. 2. The user now places a mirror surface, for example, behind this subject in the 3D space of this image representation such that the mirror image generated from this shows a rear surface of the subject as a mirror image 9.

In the present example this mirror image appears together with the original 3D representation of the subject 8 in the left display segment 10 as well as at the right display segment 11. The representation in the left segment 10 can be omitted. The multi-segment representation primarily offers advantages when more than one mirror surface is set by the user. All mirror images then can be simultaneously shown in a corresponding number of segments without overcrowding the original 3D representation of the 3D subject with mirror images.

With the present image representation device the user thus has the possibility to simultaneously, additionally visualize rear and lateral details of the subject of interest without multiple rotation of the 3D subject in the image representation, such that overall the user must spend less time for the examination of the subject Moreover, the spatial relation of individual details can be established more easily in this manner.

Although modifications and changes may be suggested by those skilled in the art, it is the intention of the inventor to embody within the patent warranted hereon all changes and modifications as reasonably and properly come within the scope of his contribution to the art.

I claim as my invention:

1. An image processing device comprising:
an image display device having a display screen;
an image processor connected to said image display device that processes a data set representing a 3D subject to produce a 3D representation of said 3D subject at said display device in a first display region of two separate display regions in said display screen;
an interaction module connected to said image processor, allowing an operator to interactively displace, rotate or zoom said 3D representation of said 3D subject on said image display device; and
a mirror surface generation module connected to said image processor and communicating with said interaction module, that automatically generates, in response to at least one mirror surface freely defined by said operator via said interaction module, at least one mirror image, defined by said mirror surface, of said 3D representation of said 3D subject to be displayed with said mirror surface in said first display region, and that also causes said at least one mirror image to be displayed duplicatively, but without said mirror surface at said image display device in a second of said display regions in said display screen.

2. An image processing device as claimed in claim 1 wherein said mirror surface generation module synchronously updates said at least one mirror image upon an interactive change of said 3D representation of said 3D subject at said image display device caused by interaction of an operator via said interaction module.

3. An image processing device as claimed in claim 1 wherein said image processor generates said 3D representation of said 3D subject with a VRT technique as a projection selected from the group consisting of a perspective projection and an orthogonal projection.

4. An image processing device as claimed in claim 1 wherein said image display device is a 3D monitor and wherein said image processor generates said 3D representation of said 3D subject in a form displayable at said 3D monitor.

5. An image processing device as claimed in claim 1 wherein said image display device comprises a plurality of sub-regions of said first display region, and wherein said mirror surface generation module generates a plurality of different mirror images of said 3D subject, respectively corresponding to a plurality of differently oriented mirror surfaces, in the respective sub-regions of said first display region, together with the respective differently oriented mirror surfaces, and also causes each mirror image to be duplicatively displayed, but without the respective differently oriented mirror surface, at said second of said display regions in said display screen of said display device.

* * * * *